Figure 1:
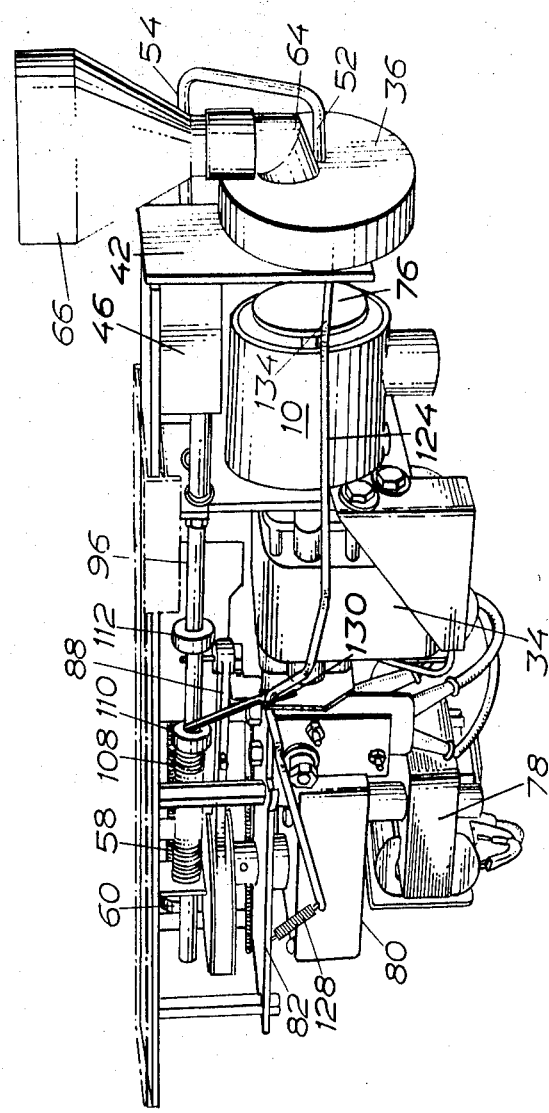

United States Patent

[11] 3,566,770

| [72] | Inventor | Ernest Ellis Crossley<br>Ansdell, Lytham, England |
|---|---|---|
| [21] | Appl. No. | 769,074 |
| [22] | Filed | Oct. 21, 1968 |
| [45] | Patented | Mar. 2, 1971 |
| [73] | Assignee | Ditchburn Organisation Limited<br>Lytham, England |
| [32] | Priority | Oct. 26, 1967 |
| [33] | | Great Britain |
| [31] | | 48,637 |

[54] APPARATUS FOR INFUSING TEA, COFFEE AND THE LIKE
9 Claims, 5 Drawing Figs.

[52] U.S. Cl. .................................................. 99/289
[51] Int. Cl. .................................................. A47j 31/22
[50] Field of Search .......................................... 99/279,
287, 289, 300, 299

[56] References Cited
UNITED STATES PATENTS

| 3,103,873 | 9/1963 | Breitenstein .................. | 99/289 |
| 3,233,535 | 2/1966 | Fowlie ........................... | 99/289 |
| 3,339,476 | 9/1967 | Troya ............................ | 99/287 |

*Primary Examiner*—Robert W. Jenkins
*Attorney*—Norris and Bateman

ABSTRACT: An apparatus for infusing a single unit serving of a beverage such as coffee wherein dry ingredients and hot liquid are fed to a chamber at least part of a wall of which is pervious to liquid, the chamber is rotated about a horizontal axis to infuse the beverage and force it outwards through the pervious wall of the chamber under the influence of centrifugal force, and the spent ingredients are discharged from one end of the chamber as by a piston disc movable relative to the chamber.

Patented March 2, 1971

3,566,770

4 Sheets-Sheet 1

INVENTOR:
ERNEST ELLIS CROSSLEY
BY Norris Bateman

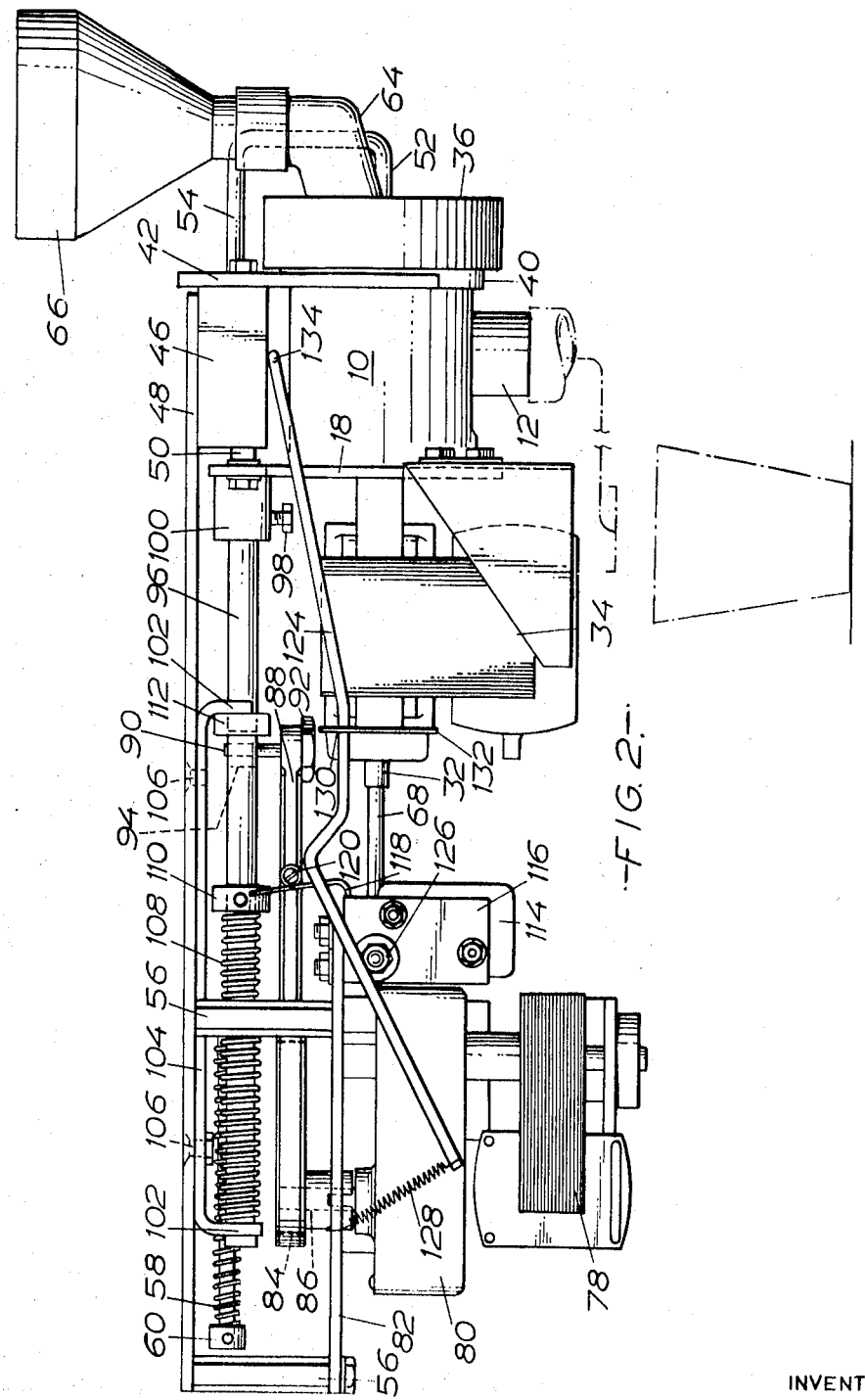

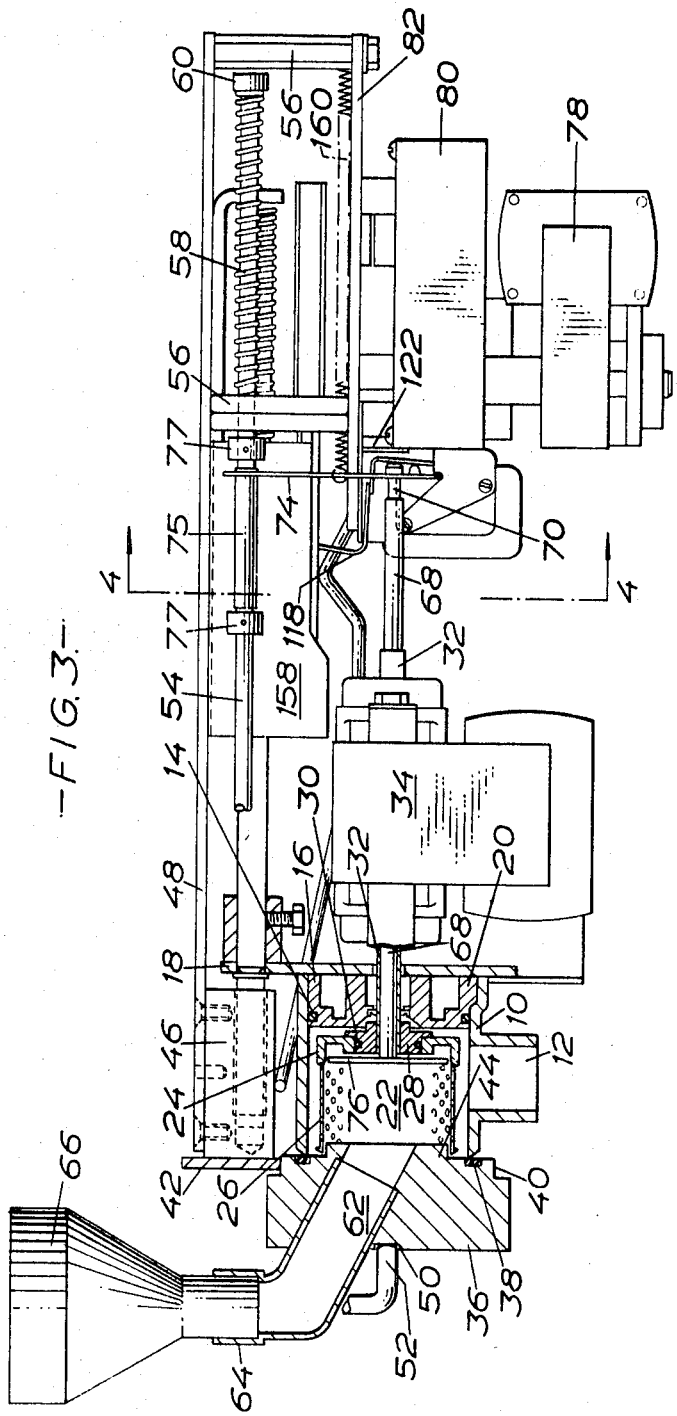

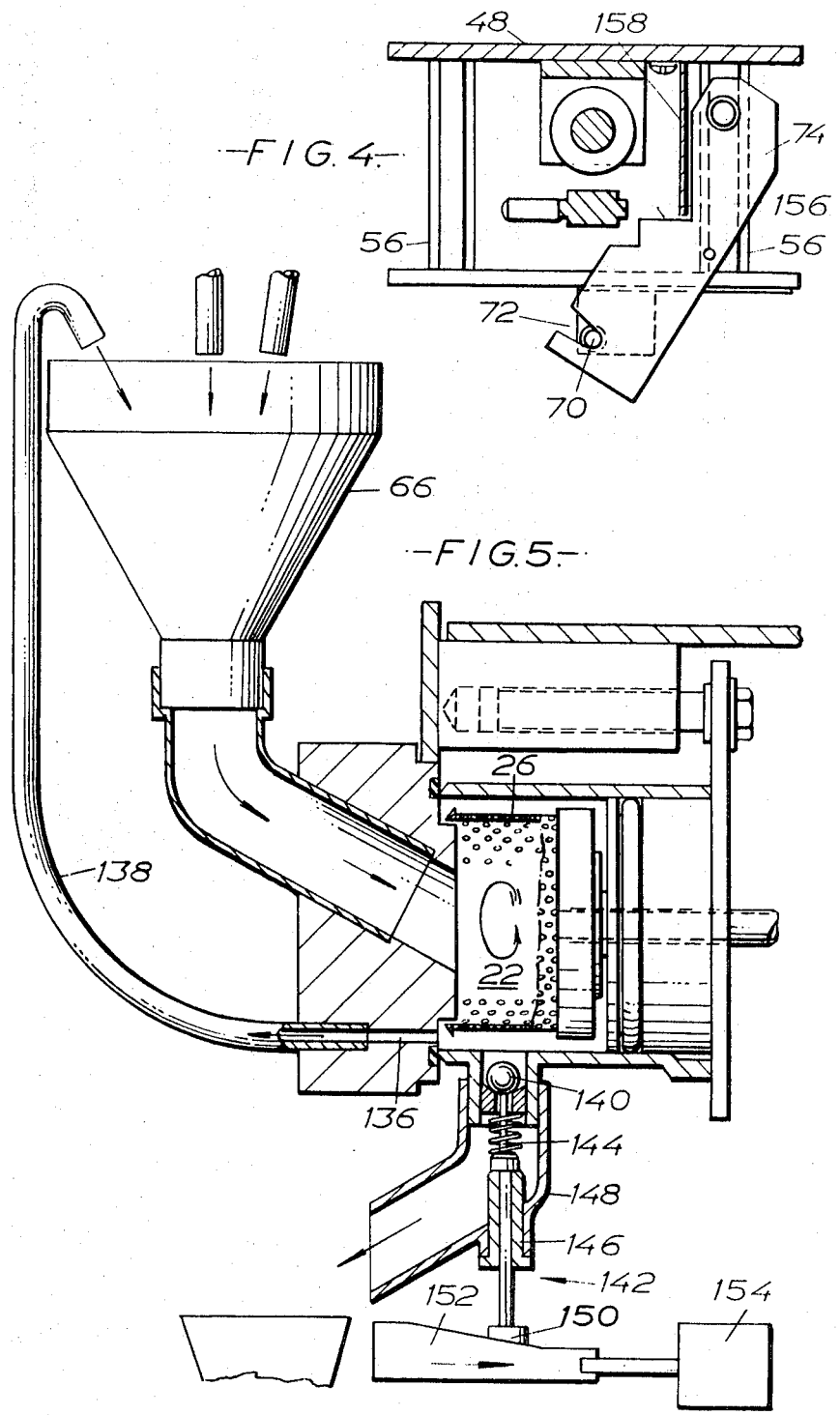

APPARATUS FOR INFUSING TEA, COFFEE AND THE LIKE

In beverage vending machines, apparatus for infusing tea, coffee and the like has to be capable of producing the beverage very rapidly, For this purpose, some apparatus use extracts of coffee and tea, the so-called "instant" coffee and tea, so that the apparatus merely has to effect mixing of the extract, usually in powder form, with hot water. Such an arrangement is effective, but it is preferable that the beverage should be infused from leaf tea or ground coffee, and normal methods using leaf tea and ground coffee require a considerable period of time to effect infusion or "brewing". To overcome this difficulty, it has been proposed to infuse coffee by forcing hot water under pressure by means of a pump, through coffee grounds in a chamber having an outlet with a filter, e.g. perforated or mesh material or filter paper, to retain the coffee grounds whilst permitting the liquid to flow to a delivery nozzle, and a similar arrangement could be employed for infusing tea from leaf tea.

The present invention is designed to provide a new or improved method of and apparatus for infusing beverages, such as tea and coffee, from granulated or powdered materials, such as leaf tea and coffee grounds, and incorporates an improved system for the removal of waste. Whilst it is primarily designed for use in beverage vending machines, the method can equally well be adapted for other purposes, for example it could be applied to beverage making apparatus for use in cafes, hotels and like establishments, or even for domestic use. Furthermore, whilst tea and coffee are the obvious beverages for infusion by a method or apparatus embodying the invention, the invention is not limited to such use, as it can be adapted to infuse other beverages.

According to one aspect of the invention, there is provided a method of infusing a single unit serving of tea, coffee or other beverage, the method comprising the steps of feeding dry ingredients and hot liquid to a chamber at least part of the wall or walls of which is or are previous to liquid, rotating a said chamber about a horizontal axis to infuse the beverage and force it outwards through the wall or walls of the chamber under the influence of centrifugal force, and discharging the spent ingredients from one end of the chamber by means of piston disc movable relative to said chamber.

According to a further aspect of the invention there is provided apparatus for infusing a single unit serving of tea, coffee or other like beverage, the apparatus including a chamber at least part of the wall or walls of which is or are pervious to liquid, means for feeding dry ingredients and hot liquid to said chamber; means for rotating said chamber about a horizontal axis to infuse the beverage and force it outwards through the wall or walls of the chamber under the influence of centrifugal force, and a piston disc movable relative to said chamber for discharging the spent ingredients from one end of the chamber.

In order that the invention may be fully understood and readily carried into effect, a preferred embodiment thereof will now be described with reference to the accompanying drawings, of which:

FIG. 1 is a perspective view of apparatus embodying the invention for infusing a single unit serving of tea, coffee or other like beverage, FIG. 2 is a view on one side of the apparatus, FIG. 3 is a part-sectional view on the other side of the apparatus, FIG. 4 is a sectional view on the line 4—4 of FIG. 3, and FIG. 5 is a sectional scrap view illustrating a possible modification of the apparatus.

Referring now to FIGS. 1—4 of the drawings, the apparatus illustrated is of a type designed for use in a beverage vending machine (and it will consequently be understood that there may be several such units in a single machine for serving several different beverages) but it will be appreciated that it can equally well be incorporated in or adapted for use in beverage infusing apparatus for cafes, hotels and like establishments as well as for domestic use.

The apparatus includes a cylindrical casing 10, disposed with its axis horizontal, having an outlet opening 12 in the lower part of its cylindrical wall. Said casing, which is made of a synthetic plastics material, is a push fit over a resilient O-ring seal 14 which encircles an adapter member 16, also made of a synthetic plastics material, secured to the front face of a vertical frame member 18. A key piece 20, which is moulded integrally with the adapter member, engages a complementary slot in the casing to ensure that the latter is maintained in position with its outlet opening projecting downwardly as shown.

A liquid pervious cylindrical chamber 22 is constituted by a bronze carrier part 24 with a brazed-on perforated cylinder 26 projecting outwardly therefrom, the cylinder and carrier therefor being mounted within the casing 10, a clearance being formed between the outer surface of the cylinder and the internal wall of the casing. Said carrier part is a push fit on a spigot 28 and is internally grooved so that it is a snap fit on a resilient split ring 30 which is accommodated in a circumferential groove in the spigot. The spigot is secured on the forward end of a hollow spindle 32 which extends rearwardly through the adapter member 16 and frame member 18, said spindle being drivably connected to a first electric motor 34 carried immediately behind said frame member.

A forward end of the casing has a chamfered edge against which a location block 36 abuts through the medium of an annular sealing ring 38 made of a resilient material which is located in a groove in an inner face of said block. Said inner face of the location block is stepped so that a register 40 is formed to locate the block within a circular opening in an outer frame member 42 and so that a central spigot portion 44 just enters the chamber 22, as shown in FIG. 3, with a slight radial clearance. The extreme end of the cylinder 26 is just clear of the adjacent surface of the block to permit free rotation of said cylinder. An outer surface of the location block 36 is provided with a central depression 50 in which an end of a return bend portion 52 of rod 54 can be seated as shown in FIG. 3. The rod 54 extends through aligned holes in the frame members 18 and 42 and in one of four pillars 56 which depend from a carrier plate 48 some distance rearwardly of the mechanism so far referred to. A spring 58 which encircles a rearward part of said rod reacts against this pillar and acts against a collar 60 secured on said rod to urge the latter rearwardly. Said spring thus acts to retain the location block in the position in which it is shown in FIGS. 2 and 3. The upper portion of the frame member 42 is secured to the forward ends of a pair of hanger blocks 46 secured in spaced relation beneath the carrier plate 48. The upper portion of the frame member 18 on the other hand is provided with a pair of forwardly projecting guide pins 50 which slidably engage respective holes in said hanger blocks. Means for controlling the movement of the frame member 18 (and with it the casing 10, adapter member 16, the cylinder 26 and driving motor 34) towards or away from the frame member 42 will be referred to presently.

A passageway 62 extends diagonally through the location block, that is to say, from a position above and to one side of the depression 50 at the front face of the block to a position where it breaks into the rear face of the block substantially at the axis of the casing 10. An adapter 64 extends outwardly and upwardly from said passageway and carries a funnel 66 which is arranged to receive hot water together with the dry ingredient, e.g. leaf tea or coffee grounds, and feed it to the chamber 22. Any convenient means may be provided for supplying measured quantities of hot water and of the dry ingredient to the funnel and such means do not form part of the present invention.

The mechanism so far described is arranged to operate in the following manner:

Hot water together with the dry ingredient is fed to the chamber 22, and the cylinder is simultaneously rotated at high speed by the motor 34, so that under the influence of centrifugal force the ingredient lies against the inner surface of the chamber and the hot water is forced through the ingredient and through the pervious wall of the cylinder into the space surrounding the cylinder within the casing 10. Tea, coffee or the like, as the case may be, will thus be infused as the water is forced through the dry ingredient and will flow out of the casing through the outlet opening 12, through a flexible pipe and delivery nozzle shown in chain-dotted lines in FIG. 2, and into a cup or other receptacle positioned as shown upon a delivery platform. Other ingredients, for example milk and sugar, may of course be delivered to the cup or other receptacle in known manner but the present invention is not concerned with the mechanism for achieving this and it is not illustrated in the drawings.

At the completion of the infusing operation, the motor 34 is allowed to rotate the chamber for a predetermined time during which liquid will be expelled from the spent leaf tea, coffee grounds or the like, which latter will then be in a relatively dry state, which is convenient for discharge into a waste disposal receptacle (not shown).

Mechanism for effecting discharge of the spent ingredient into the waste disposal receptacle includes a rod 68 which extends through the hollow spindle 32, a rearward end of said rod having a reduced diameter portion 70 which engages a slot 72 in a normally fixed catch plate 74 carried by a sleeve member 75 which is freely rotatable on the rod 54 between a pair of location collars 77. A forward end of the rod 68 is provided with a piston disc 76 which, as shown in FIG. 3, substantially fills the end of the perforated cylinder 26 to remote from the location block 36. Said mechanism also includes the means referred to previously for controlling the movement of the frame member 18 towards or away from the frame member 42 and said means comprise a second electric motor 78 and a reduction gear unit 80 (both depending from a plate 82 carried by the four pillars 56) and crank and connecting rod mechanism disposed in the space between the carrier plate 48 and the plate 82. The crank and connecting rod mechanism includes an eccentric 84, mounted on an output shaft 86 of the gearbox 80, and connected rod 88 one end of which encircles the eccentric and the other end of which is provided with an upstanding operation peg 90 formed integrally with a screw 92 which is located in a threaded hole in the end of the connecting rod. The operating peg extends through a short slot 94 in an operating rod 96 a forward end of which is secured by a screw 98 in an adapter 100 secured centrally to the rear face of the frame member 18. A rearward end of the operating rod extends freely through a hold in an abutment member 102, and a further abutment member is provided with a slotted aperture through which a midportion of the operating rod extends. Both abutment members are formed by the downwardly turned ends of a length of bar 104 which is secured to the carrier plate 48 by screws 106. A coil compression spring 82 surrounds a rearward portion of the operating rod, where it acts against a collar 110 and reacts against the abutment member 102. Said spring acts to urge the frame member 18 forwardly to the limit allowed by the length of the slot 94 in the operating rod or, when the connecting rod is disposed in its most forwardly projecting position as shown in FIG. 2, until a collar 112 bears against the abutment member 102.

An electric switch 114 is secured to a bracket 116 which depends from the plate 82 in front of the reduction gear unit, and an on-off lever 118 extends upwardly from said switch to intersect a path of movement of a screw 120 which extends laterally from the connecting rod intermediate its ends. The arrangement is such that when the motor 78 is triggered into action by a timer (not shown) at the completion of the infusing operation, the crank and connecting rod mechanism withdraws the frame member 18 (and with it the casing 10, adapter means 16, the cylinder 26 and driving motor 34) away from the frame member 42 through a distance slightly greater than the length of the cylinder 26 so that, as shown in FIG. 1, the piston disc 76 is exposed clear of the forward end of the casing 10. The location block remains in its normal position (except for a small movement by which it abuts against the fixed frame member 42 instead of against the casing 10) so that the spent ingredient is able to fall from the open space between the piston disc and the location block into the waste disposal receptacle (not shown) which is disposed below the casing. The mass of spent ingredient within this space is released to some extent by the fact that the piston disc is allowed a small degree of rearward movement (a slightly greater movement than that allowed the location block) whilst a space between the end of the rod 68 and an abutment member 122 is taken up.

A scraper device is provided for dislodging the relatively dry spent ingredient from the face of the piston disc if it has adhered thereto. The scraper device is constituted by a length of rod 124 pivoted intermediate its ends about a pivot pin 126 which projects outwards from the bracket 116. A rearward end of said rod is connected to one end of a tension spring 128, and a portion of the rod just forward of the pivot pin rides in a slot 130 in a plate 132 which projects laterally from the rear of the motor 34. The shape of the rod is such that, during the latter part of the rearward movement of the motor 34 and of the casing 10 and other retractable parts to reveal the piston disc 76, the forward end of the rod pivots downwardly under the action of the spring 128 and a laterally cranked portion 134 of said rod is passed down the face of the piston disc. Said laterally cranked portion is, of course, returned to its raised inoperative position overlying the casing 10 during the initial part of the return movement of the motor 34 and other retractable parts.

The motor 78 continues to run until the eccentric 84 has completed one full revolution, when the on-off lever 118 of the switch 114 is disengaged from the screw 120, as the latter is moved with the connecting rod 88. By this time, the forward end of the casing 10 will have abutted once more against the location block 36 and the apparatus is ready for a further infusion cycle.

The apparatus can very simply be partly stripped down from cleaning the parts with which the infused beverage comes into contact, the location block 36 and funnel 66 being released when the return bend portion 52 of the rod 54 has been swiveled clear of the block, and the casing 10 and cylinder 26 being pulled off the parts which normally hold them resiliently in position. The piston disc 76 on the other hand is released by a forward pull on the rod 54, against the action of the spring 58, which causes the catch plate 74 to be drawn forwardly for a surface 156 of said plate to ride down the edge of a cam plate 158. The rod 68 is thus released from the slot 72 in the catch plate 74 and the piston disc can thus be drawn out by hand. It can, of course, just as easily be replaced when the rod 54 has once more been pulled forward, and a light spring 160 is connected at one end to catch plate and at its other end to a rearward part of the plate 82 (extending diagonally across the said plate) to urge the slotted end of the catch plate into engagement with the reduced diameter portion 70 of the rod 68 as the rod 54 is returned to its normal position under the action of the spring 58.

Referring now to FIG. 5, in a modification of the apparatus just described the infused beverage is recirculated through the chamber 22 for a predetermined period of time before being dispensed. To effect this recirculation, the location block is provided with a passageway 136 which opens into the annular space in the casing 10 which surrounds the perforated cylinder 26. A pipe 138 is connected into the outer end of said passage and extends upwardly to discharge recirculating liquid into the funnel 66. The outlet opening 12 in the lower part of the cylindrical wall of the casing 10 is provided with a check valve 140 and means generally indicated 142 are provided for opening said check valve after a predetermined period of time (by which time the beverage will be fully infused) so that the liquid is dispensed into the receptacle instead of being caused to flow through the pipe 138 under the action of centrifugal pressure produced by the rotation of the cylinder 26. The means for opening the check valve are constituted by an unseating pin 144 which extends slidably through an adapter 146 in an outlet pipe 148. A shoe 150 which is formed at the lower end of the unseating pin is arranged to ride upon a cam plate 152 controlled by an electric solenoid 154. The solenoid is energized in response to a signal from the timer when the recirculating beverage has been fully infused.

The required duration of recirculation will, of course, depend upon several factors, for example the amount of dry ingredient used for each serving and the strength or quality of beverage required.

Various other modifications may, of course, be made without departing from the scope of the invention defined in the appendent claims. For example, the required speed of rotation of the perforated cylinder 26 may be arrived at by trial and experiment (it has been found that the centrifugal action assists infusion but, if the speed of rotation of the perforated cylinder is too great, various unwanted constituents of leaf tea are served with the infused beverages). It will also be understood that the chamber 22 need not necessarily be of round cross section. It could, for example, be of substantially square cross section but it would, of course, still have an open end for the ejection of the spent ingredient and the piston disc 76 would be of complementary shape. The wall or walls of the chamber need not be entirely pervious to the liquid but it is essential that at least a part of the wall or walls should be. Relative movement between the piston disc and the chamber could in a further modification be effected by holding the casing 10 stationary and moving the piston disc axially together with the location block 36.

As previously explained, the type of apparatus described and illustrated is of a type designed for use in a beverage vending machine and in such a machine there may be several such units for serving different beverages, that is to say, one for dispensing tea, one for dispensing coffee and one for dispensing cocoa and so on. One or more of such units may be of modified type for recirculating the infused beverage. The units may be arranged side by side in the vending machine and may be suspended with their respective carrier plates in longitudinal guides as shown in chain-dotted lines in FIG. 1, so that they can be drawn out singly for servicing or repair or for replacement by a new or repaired unit. Such a machine will, of course, be provided with conventional means for selecting the beverage required and any additional ingredients—i.e. milk and/or sugar.

I claim:

1. Apparatus for infusing a single unit serving of a beverage such as coffee, the apparatus including a chamber at least part of a wall of which is pervious to liquid; means for feeding dry ingredients and hot liquid to said chamber; means for rotating said chamber about a horizontal axis to infuse the beverage and force it outwards through the previous wall of the chamber under the influence of centrifugal force; and a piston disc movable relative to said chamber for discharging spent ingredients from one end of the chamber.

2. Apparatus according to claim 1, wherein the chamber is constituted by a perforated cylinder.

3. Apparatus according to claim 1, wherein the chamber is carried by a hollow spindle drivably connected to a first electric motor, and the piston disc is carried by a rod extending through said hollow spindle.

4. Apparatus according to claim 1, including a scraper device arranged to pass down the face of the piston disc to dislodge spent ingredient from said disc when the latter has been moved relative to the chamber through a distance sufficient to reveal its face clear of the end of said chamber.

5. Apparatus according to claim 4, wherein the scraper device is constituted by a length of rod pivoted intermediate its ends, one end of said rod being connected to a tension spring and the other end of said rod being formed as a scraper for dislodging spent ingredient from the face of the piston disc, a portion of the rod adjacent its pivot being arranged to ride on a part of mechanism which moves relative to said pivot when the piston disc is moved relative to the chamber and the rod being so shaped that, during the latter part of the relative movement to reveal the face of the piston disc, said scraper passes across the face of said piston disc and, during the initial part of a return movement, is automatically returned to an inoperative position.

6. Apparatus according to claim 1, including a timer whereby the chamber is rotated for a period of time sufficient to ensure that the spent ingredients are substantially dry before being discharged from the chamber.

7. Apparatus according to claim 1, wherein the chamber is contained within a cylindrical casing disposed with its axis horizontal and having an outlet opening in the lower part of its cylindrical wall through which the infused serving of the beverage is dispensed.

8. Apparatus according to claim 7, wherein a valve is provided in the outlet opening from the cylindrical casing and a passageway opens into an annular space surrounding the chamber within said casing and communicates again with the interior of said chamber, the arrangement being such that, until the valve is open, the infused beverage is recirculated through the chamber.

9. Apparatus according to claim 1, wherein the chamber is movable axially, to effect relative movement between said chamber and the piston disc, by means of crank and connecting rod mechanism drivably connected to a second electric motor.